US009792643B1

(12) United States Patent
Masterman

(10) Patent No.: US 9,792,643 B1
(45) Date of Patent: Oct. 17, 2017

(54) ORGANIZATION OF RECURRING ITEMS

(71) Applicant: Amazon Technologies, Inc., Seattle, WA (US)

(72) Inventor: Michael Frederick Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 14/496,727

(22) Filed: Sep. 25, 2014

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0635* (2013.01); *G06Q 10/083* (2013.01)

(58) Field of Classification Search
CPC ............................................ G06C 30/06–30/08
USPC ............................................... 705/26.1–27.2
See application file for complete search history.

(56) References Cited

U.S. PATENT DOCUMENTS

| 7,251,617 B1* | 7/2007 | Walker | G06Q 20/085 |
| | | | 705/14.27 |
| 2014/0240754 A1* | 8/2014 | Smyth | G06F 3/1204 |
| | | | 358/1.15 |
| 2015/0278859 A1* | 10/2015 | Sundaresan | G06Q 30/0255 |
| | | | 705/14.53 |

* cited by examiner

*Primary Examiner* — Ethan D Civan
(74) *Attorney, Agent, or Firm* — Kilpatrick Townsend & Stockton LLP

(57) ABSTRACT

In some examples, a user may be enabled to organize a plurality of items for display within a table. The plurality of items may include items that are available for delivery on a subscription basis from an electronic marketplace. The table may be arranged in accordance with a period corresponding to at least one of plurality of delivery intervals. The user may adjust the placement of individual items by using a drag-and-drop operation. Based at least in part on the location of individual items, delivery intervals may be determined for delivery of individual items.

20 Claims, 8 Drawing Sheets

ORGANIZATION OF RECURRING ITEMS

BACKGROUND

Certain services provided to users may be recurring. For example, a user of a subscription service may be entitled to receive certain services under the subscription according to a particular interval. The interval may be related to the services offered under the subscription. For example, under a subscription for milk delivery, a user may receive milk daily or weekly. In another example, under a magazine subscription, a user may receive a magazine monthly.

BRIEF DESCRIPTION OF THE DRAWINGS

Various embodiments in accordance with the present disclosure will be described with reference to the drawings, in which.

DETAILED DESCRIPTION

Figure 1:
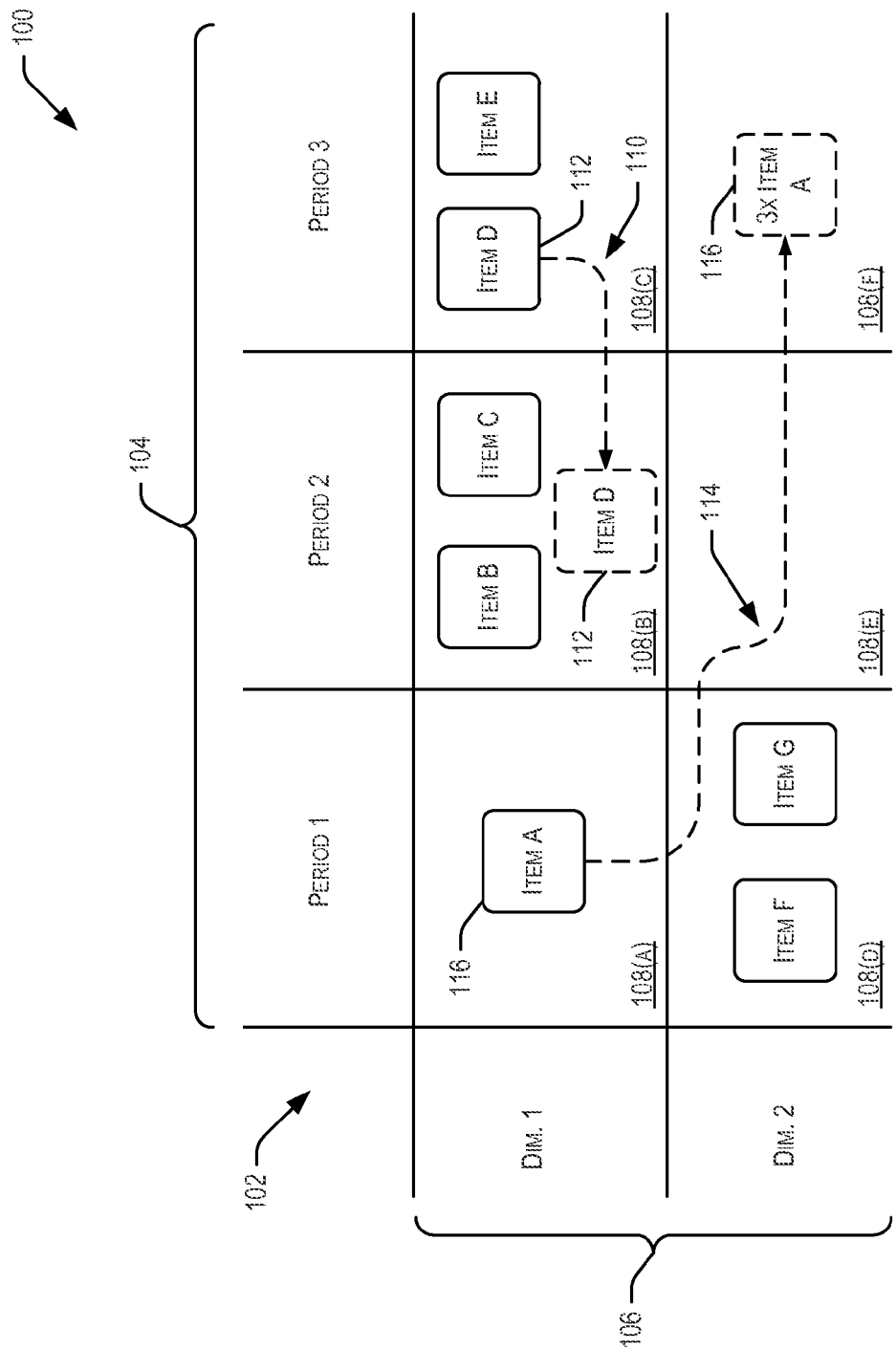
FIG. 1 is an example environment for implementing techniques relating to organization of recurring items as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present specification are directed to, among other things, techniques relating to organization of recurring items. In particular, this specification will discuss techniques relating to the organization of items available on a subscription basis in connection with an electronic marketplace. While the particular techniques will be discussed in the context of items available on a subscription basis and that are available in connection with an electronic marketplace, this specification is not limited to this particular context. For example, as would be apparent to one of ordinary skill in the art, the techniques described herein may be applicable for organization of recurring items in other contexts, such as payments for recurring services (whether as part of a subscription or otherwise), setup for recurring meetings, plans for recurring holidays, or other contexts involving recurring elements.

The techniques described herein may be applicable to a replenishment service that facilitates delivery of qualifying items to a user's home. To use the replenishment service, the user may first sign up for the service. The user may also select which items the user desires to be delivered, an interval for delivery of the items, and a delivery location. The replenishment service may be configured to handle the rest. In other words, at least for the qualifying items, the user may not be bothered with repeatedly ordering items that are used up regularly. This is because the replenishment service automatically schedules the deliveries for these items and debits an account of the user at or around the time they are delivered.

Turning now to a particular example of organizing items that are available on a subscription basis, a user may be presented, on a computer or other user device, a list of items (e.g., consumable household goods) that may be selected or have already been selected for a recurring order. The user may also be presented a table (e.g., in the form of a digital calendar).

The table may be used to graphically display which items are scheduled for delivery and according to what delivery interval (e.g., every month, every two months, or the like). The table may be partially populated with items or empty when the user first uses the table for organizing items. Using a user interface of the computer, the user may select an item from the list and, using a drag-and-drop operation, may place the selected item in a cell of the table. There may be other items already in the cell or, alternatively, the cell may be empty. Based on the location of the cell, a delivery interval may be determined for the item. This determination may include grouping the item with other items scheduled for delivery on a similar schedule. Added information, in the form of prompts, messages, or confirmations, may also be presented to the user as the user moves items between cells. The added information may indicate cost savings potentially available to the user by moving the items to different cells.

Turning now to the figures, in FIG. 1 is illustrated environment 100 for implementing techniques relating to organization of recurring items as described herein. In some examples, the environment 100 may include table 102 which may be provided for presentation by a recurring management service (not shown). The table 102 is an example of a data structure that may be presented to a user for implementing techniques related to organization of recurring items. In some examples, the table 102 may include a calendar, matrix, or other device for organizing data. The table 102 may include an interval portion 104, a dimension portion 106, and one or more cells 108(*a*)-108(*f*). The interval portion 104 may include any suitable number of intervals arranged according to any suitable period. For example, as illustrated, the interval portion 104 may include three periods: "Period 1," "Period 2," and "Period 3." The dimension portion 106 may include any suitable number of dimensions arranged in any suitable manner. In some examples, the dimensions are of the same class (e.g., addresses), but differ from each other in certain aspects (e.g., a first address is different from a second address). In some examples, the dimensions are of different classes (e.g., addresses vs. services).

Turning now to the contents of the cells 108(*a*)-108(*f*), in the cells 108(*a*)-108(*f*) are illustrated representations of items as boxes with a string of text indicating an item letter (i.e., "Item _"). In some examples, a representation of an item may be moved among periods within a single dimension. For example, such a move may be indicated by movement 110. The movement 110 may include representation 112 moving from "Period 3" within "Dimension 1" to "Period 2" within "Dimension 1." The movement 110 may have been initiated by the recurring management service prompting the user to make the move. In some examples, a representation of an item may be moved between more than one dimensions. For example, such a move may be indicated by movement 114. The movement 114 may include representation 116 moving from "Period 1" within "Dimension 1" to "Period 3" within "Dimension 2." Similar to the movement 110, the movement 114 may have been initiated by the recurring management service. In some examples, the quantity of the items represented by the representation 116 may increase based on the period change. For example, if the Period 1 included delivery of items monthly and the Period 3 included delivery of items every three months, the movement 114 of the representation 116 from Period 1 to Period 3 may result in a less frequent delivery (i.e., every three months), but with a greater quantity of the item being delivered than was to be delivered under Period 1. In some examples, when the dimensions are of different classes, the movement of a representation (e.g., the movement 114 of the representation 116) between dimensions may be limited. This may be because items of a first dimension are incompatible with items of a second dimension.

Figure 2:
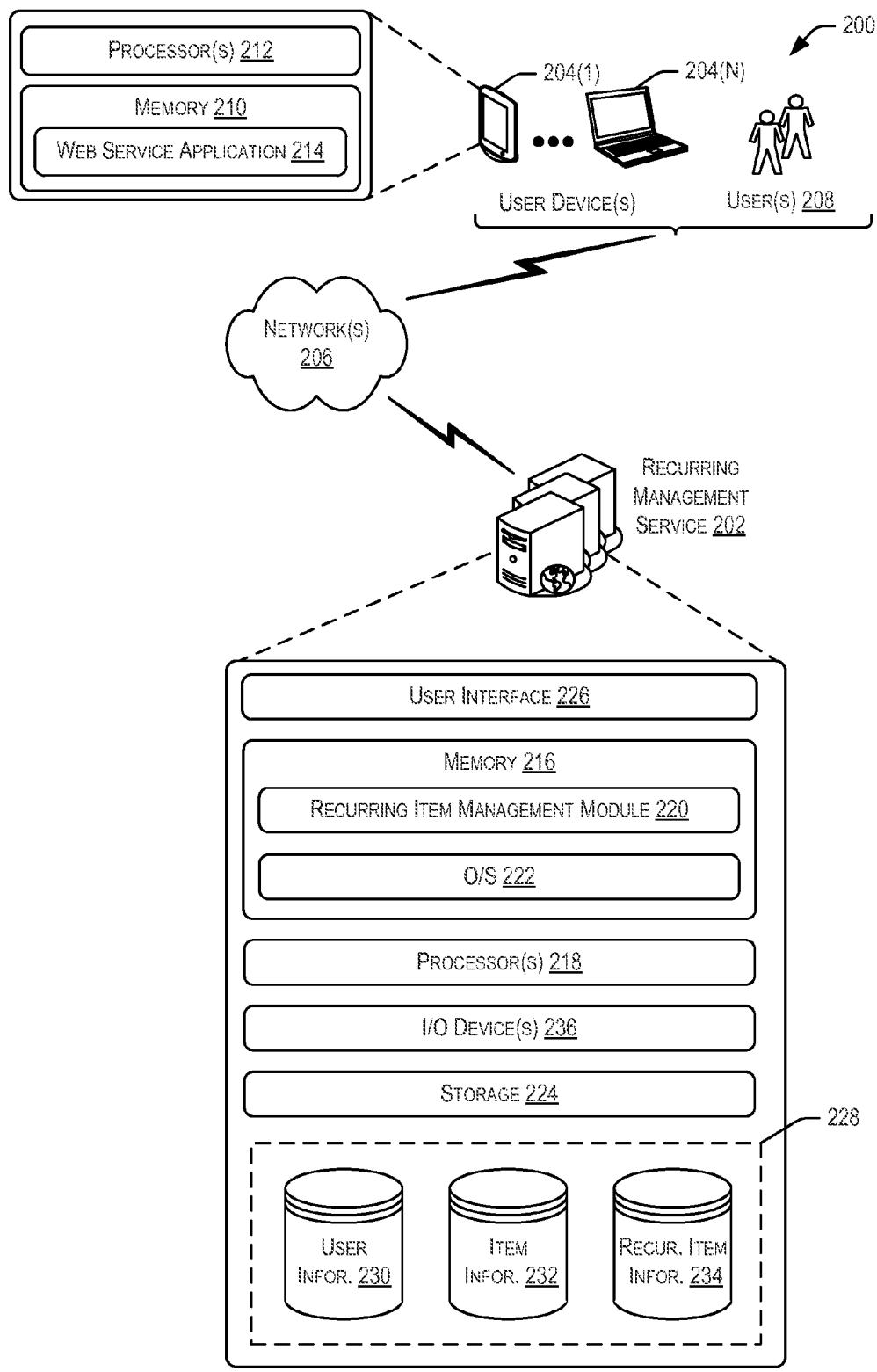
FIG. 2 is an example schematic architecture for implementing techniques relating to organization of recurring items as described herein, according to at least one example.

Turning next to FIG. 2, in FIG. 2 is illustrated an example architecture 200 for implementing techniques relating to organization of recurring items as described herein. The architecture 200 may include a recurring management service 202. The recurring management service 202 may be included as part of an electronic marketplace (not shown) and may interface with elements of the architecture 200 to implement the techniques described herein. In some examples, the recurring management service 202 may be a stand-alone service operated on its own or in communication with an electronic marketplace. The recurring management service 202 may be in communication with one or more user devices 204(1)-204(N) (hereinafter, "the user device 204") via one or more network(s) 206 (hereinafter, "the network 206"). The network 206 may include any one or a combination of many different types of networks, such as cable networks, the Internet, wireless networks, cellular networks, radio networks, and other private and/or public networks.

Turning next to the details of the user device 204, the user device 204 may be any suitable device capable of communicating with the recurring management service 202. For example, the user device 204 may be any suitable computing device such as, but not limited to, a mobile phone, a smart phone, a personal digital assistant (PDA), a laptop computer, a personal computer, a desktop computer, a set-top box, a thin-client device, or other computing device. In some examples, the user device 204 may be in communication with the recurring management service 202 via one or more web servers constituting an electronic marketplace (not shown) connected to the network 206 and associated with the recurring management service 202. The user device 204 may be utilized by one or more users 208 (hereinafter, "the user 208") for interacting with the recurring management service 202. The user device 204 may therefore include a memory 210, a processor 212, a web-service application 214, and any other suitable feature to enable communication and interaction with the elements of the architecture 200. The web-service application 214 may be in the form of a web browser, an application programming interface (API), virtual computing instance, or other suitable application. The user device 204 may be configured such that the user 208 may utilize the user device 204 to interact with the recurring management service 202 to implement the techniques described herein.

Turning now to the details of the recurring management service 202, the recurring management service 202 may include one or more service provider computers, perhaps arranged in a cluster of servers or as a server farm, and may host web service applications. These servers may be configured to host a website (or combination of websites) viewable via the user device 204. The recurring management service 202 may include at least one memory 216 and one or more processing units (or processor(s)) 218. The processor(s) 218 may be implemented as appropriate in hardware, computer-executable instructions, software, firmware, or combinations thereof. Computer-executable instruction, software or firmware implementations of the processor(s) 218 may include computer-executable or machine-executable instructions written in any suitable programming language to perform the various functions described. The memory 216 may include more than one memory and may be distributed throughout the recurring management service 202. The memory 216 may store program instructions (e.g., recurring item management module 220) that are loadable and executable on the processor(s) 218, as well as data generated during the execution of these programs. Depending on the configuration and type of memory including the recurring management service 202, the memory 216 may be volatile (such as random access memory (RAM)) and/or non-volatile (such as read-only memory (ROM), flash memory, or other memory). The recurring management service 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 216 may include multiple different types of memory, such as static random access memory (SRAM), dynamic random access memory (DRAM), or ROM. Turning now to the contents of the memory 216 in more detail, the memory 216 may include an operating system 222 and one or more application programs, modules, or services for implementing the features disclosed herein including at least the recurring item management module 220.

In some examples, the recurring management service 202 may also include additional storage 224, which may include removable storage and/or non-removable storage. The additional storage 224 may include, but is not limited to, magnetic storage, optical disks, and/or tape storage. The disk drives and their associated computer-readable media may provide non-volatile storage of computer-readable instructions, data structures, program modules, and other data for the computing devices. The memory 216 and the additional storage 224, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the recurring item management module 220. As discussed in more detail with reference to FIG. 3, the modules of the recurring management service 202 may include one or more components. The recurring management service 202 may also include input/output (I/O) device(s) and/or ports 236, such as for enabling connection with a keyboard, a mouse, a pen, a voice input device, a touch input device, a display, speakers, a printer, or other I/O device.

In some examples, the recurring management service 202 may also include a user interface 226. The user interface 226 may be utilized by an operator, or other authorized user to access portions of the recurring management service 202. In some examples, the user interface 226 may include a graphical user interface, web-based applications, programmatic interfaces such as application programming interfaces (APIs), or other user interface configurations. The recurring management service 202 may also include data store 228. In some examples, the data store 228 may include one or more databases, data structures, or the like for storing and/or retaining information associated with the recurring management service 202. The data store 228 may include data structures, such as user information database 230, item information database 232, and recurring item information database 234. The user information database 230 may be used to retain information pertaining to users of the recurring management service 202, such as the user 208. Such information may include, for example, user account information (e.g., electronic profiles for individual users), demographic information for users, payment instrument information for users (e.g., credit card, debit cards, bank account information, and other similar payment processing instruments), account preferences for users, shipping preferences for users, purchase history of users, and other similar information pertaining to a particular user, and sets of users, of the recurring management service 202. In some examples, the information retained in the user information database 202 may include default information for a user or group of users based on purchase history associated with the user or group of users. In some examples, default information may be based on demographic information associated with the user. The default information may be used to establish a baseline for a new user. The item information database 232 may include information pertaining to items that may be arranged according to techniques described herein. For example, the item information database 232 may be accessible by the user 208 of the user device 204 to search for, and retrieve, items to add to an item table. In some examples, the item information database 232 may be shared with an electronic marketplace such that the item information database 232 includes similar information that may be available via the electronic marketplace. The item information database 232 may be organized based on a service for which a user, such as the user 208, has signed up. For example, while the item information database 232 may include an expansive collection of items, certain items may not be searchable if the user's 208 service does not allow it. In some examples, the item information database 232 may include added details about each item. For example, the added details may include graphical information (e.g., pictures, photographs, etc.), user comments and reviews relating to items, historical purchase information for items, predicted purchase information for items, subscription-related information for items, and other details about items. This information may be presented to users at different points in time to influence or drive subscription and purchase services. In some examples, this information may be used by the recurring management system to determine subscription and purchase related details such as purchase incentives, delivery routes, shipping details, and other similar subscription and purchase related details. Finally, the recurring item information database 234 may be configured to store item records that have been arranged using the techniques described herein. For example, as the user 208 arranges items from the item information database 232 in a table, the recurring item management module 220 may store the items in the recurring item information database 234 in association with the user 208. In some examples, each item stored in the recurring item information database 234 may include a unique record identifier. The unique record identifier may be used to track the item as it is stored in the recurring item information database 234.

Figure 3:
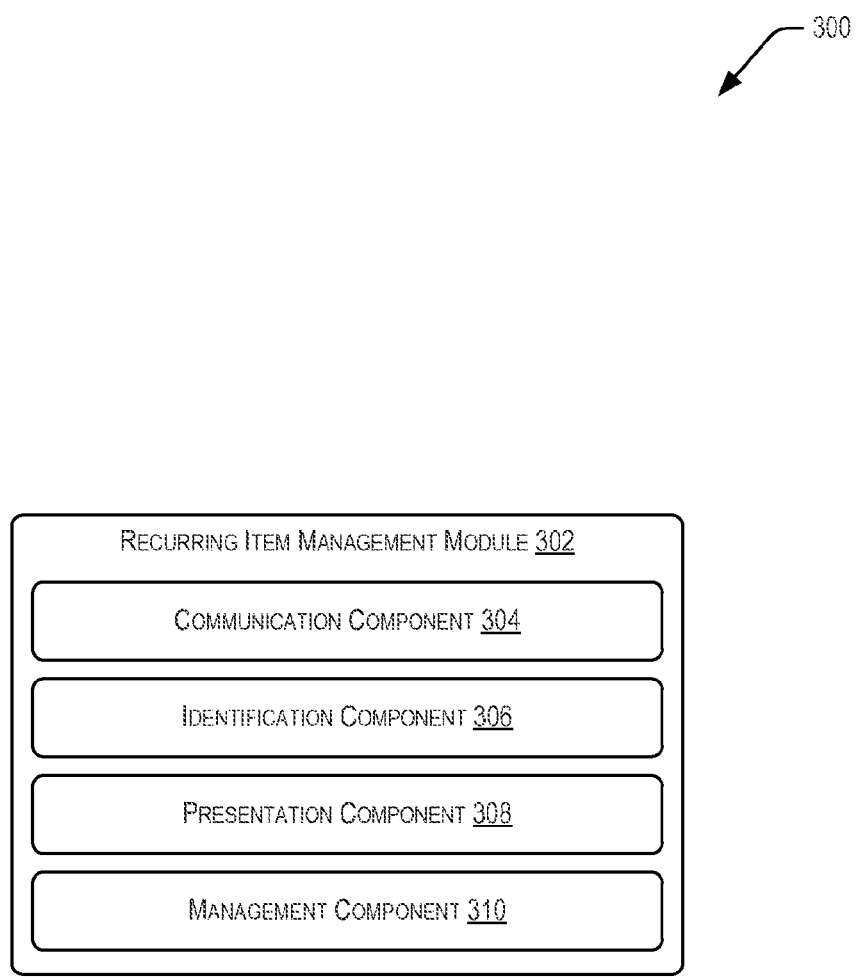
FIG. 3 is an example device for implementing techniques relating to organization of recurring items as described herein, according to at least one example.

In FIG. 3, example device 300 is illustrated including recurring item management module 302. The recurring item management module 302 is an example of the recurring item management module 220 discussed previously. The recurring item management module 302 may be configured to manage one or more sub-modules, components, and/or services directed to examples disclosed herein. In some examples, the recurring item management module 302 may include a communication component 304, an identification component 306, a presentation component 308, and a management component 310. While these modules and components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules may perform the same tasks as the recurring item management module 302 or other tasks and may be implemented in a similar fashion or according to other configurations.

Generally, the communication component 304 may be configured to manage communications between user devices and a recurring management service. For example, the communication component 304 may be configured to receive requests from user devices and send responses to user devices. The identification component 306 may be configured to access one or more data structures and/or memory devices to identify certain items. In some examples, identified items may be added to a table or other visual arrangement of items as described herein. The presentation component 308 may be configured to provide instructions to user devices for presenting web pages, including content, text, images, tables, and other similar aspects of web pages. In accordance with techniques relating to recurring item organization, the presentation component 308 may provide for presentation of representations of items. The representations may be organized within a table, calendar, matrix, or by using any other suitable organization structure. The management component 310 may be configured to manage various aspects of the techniques described herein. For example, the management component 310 may determine intervals based on the location of certain items. In some examples, the management component 310 may update delivery schedules.

Figure 4:
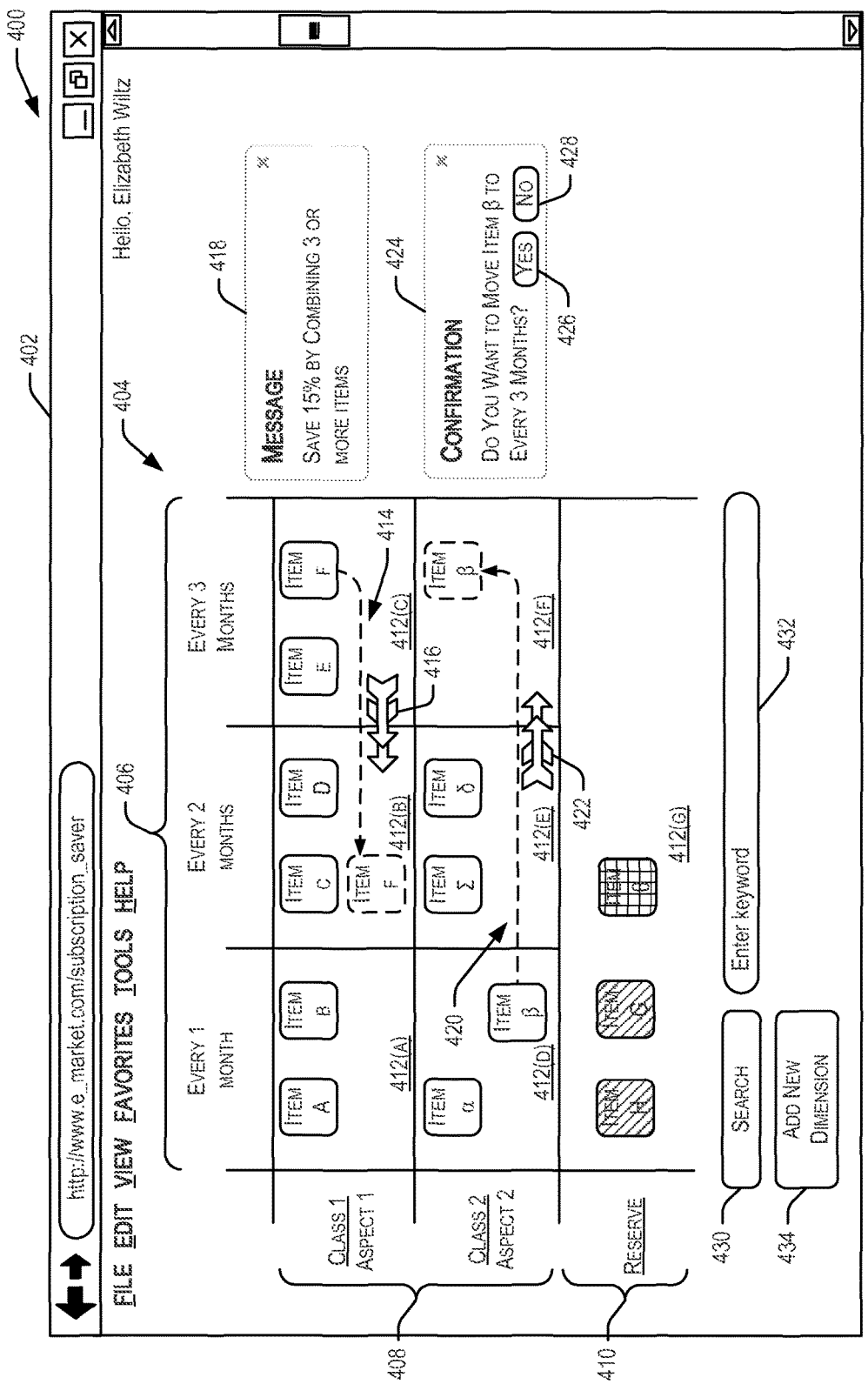
FIG. 4 is an example diagram depicting techniques relating to organization of recurring items as described herein, according to at least one example.

Turning next to FIG. 4, in FIG. 4 is illustrated diagram 400 depicting techniques relating to organization of recurring items as described herein. In some examples, the recurring item management module 220 (FIG. 2) of the recurring management service 202 (FIG. 2) may perform the techniques described with reference to the diagram 400. The diagram 400 may include user interface 402 in the form of a webpage. In some examples, the user interface 402 may be presented on a display of a user device based on instructions received from a recurring item management service. In some examples, content, similar to that illustrated as the user interface 402, may be presented to a user after logging into an electronic marketplace or signing up for a service such as the recurring item management service. Thus, at least a portion of the content and its arrangement within the user interface 402 may be unique to a particular user. The user interface 402 may include table 404. Within the table 404 may presented and organized various items in accordance with recurring item organization techniques described herein. For at least these purposes, the table 404 may include an interval portion 406 along a horizontal axis, a dimension portion 408 along a vertical axis, a reserve portion 410, and one or more cells 412(a)-412(g) disposed adjacent the interval portion 406 and the dimension portion 408.

The interval portion 406 may include one or more intervals organized in accordance with one or more periods. In some examples, the one or more intervals may be referred to as frequency intervals because they may define the frequency of certain events. For example, the interval portion 406 may include an "Every 1 Month" interval, an "Every 2 Months" interval, and an "Every 3 Months" interval. These example intervals, of the interval portion 406, may increase by a one-month period moving from left to right. In some examples, additional periods may be included. While the interval portion 406 is illustrated as including monthly intervals, it is understood that other intervals according to different periods are within the scope of this specification. For example, daily, weekly, yearly, and any combination of the foregoing are within the scope of this specification. In some examples, the intervals may indicate specific actions to be taken by the recurring management service based on a service represented in the dimension portion 408. For example, if "Dim. I" of the dimension portion 408 was an item delivery subscription service, then the interval portion 406 may indicate the frequency of delivery for items under the item delivery subscription service.

Turning now to the dimension portion 408, in the dimension portion 408 may be presented dimensions such as "Dim. 1" and "Dim. 2." In some examples, the dimension portion 408 may be adjusted to included different classes of dimensions (i.e., dimensions that have varied characteristics) with various aspects (e.g., characteristics of a class) of the different classes also being adjusted. Classes of dimensions may include, for example, an item delivery subscription service, a produce delivery subscription service, a pantry item delivery service, a literature subscription service, and other similar services. Aspects of classes of dimensions may be dependent on the particular class. For example, aspects of an example class may include user profile characteristics (e.g., shipping address, payment instrument details (e.g., expiration date, last four digits of account, and other similar details), and other details). In some examples, the dimension portion may include two dimensions, each with the same class, but with different aspects of the class. For example, an item delivery service (i.e., one class) for the same user with two different shipping addresses (i.e., two aspects). It may be desirable to group classes in this manner in order to efficiently display representations of items in graphical format to users.

Turning now to the details of the cells 412(a)-412(i), in the cells 412(a)-412(i) are illustrate various representations of items as boxes with a string of text indicating an item letter (i.e., "Item _"). Items that may be represented by the various representations may include, for example, goods or products (e.g., perishable goods, non-perishable goods, household goods or products, pet supply goods or products, consumable goods or products, office supply products, automotive products, recreational products, produce goods, entertainment products, literature products, and other similar goods and products) and services (e.g., periodical subscription services, entertainment services, online streaming services, consulting services, web-page hosting services, virtual computing services, and other similar services). Although representations of items in the table 404 are illustrated as boxes with text, it is understood that any suitable electronic representation may be used to represent items including, for example, textual representations, pictorial representations, photographic representations, graphical representations, other similar electronic representations, and any combination of the foregoing. For reasons of clarity, the remaining explanation of the diagram 400 may refer to "representations of items" simply as "items." For example, the representation of Item A may be refereed to simply as "Item A."

Turning now to the reserve portion 410, in the reserve portion 410 items may be placed for reservation or holding purposes. In some examples, the items may include items from Class 1 and Class 2. Thus, the reserve portion 410 may be configured to hold items irrespective of where the items were originally placed or to which dimensions they may have belonged. In some examples, the items in the reserve portion, such as Item H within the cell 412(g), may be shaded or include some other designation to indicate that they are not currently being used. The indication may change depending on from which class the item originated. For example, Class 1 includes items indicated by the English alphabet, while Class 2 includes items indicated by the Greek alphabet. Items within the reserve portion 410 may be indicated accordingly. In some examples, the reserve portion 410 may include items that the user receives at a greater interval than currently available or shown. For example, assume that Item H is eggnog. The user may only desire to receive eggnog during the month of December. Accordingly, the user may retain Item H (i.e., the eggnog) in the reserve portion 410 during the spring and summer and then place it in the appropriate cell for delivery in December. In some examples, the system may automatically select an interval for delivery of at least some items (e.g., the eggnog) in the reserve portion 410.

The items illustrated in the table 404 may have been previously placed in the table 404 by a user utilizing techniques described herein. In some examples, the table 404 may be populated or at least partially populated with items when the user first signs up to use a particular service or after the user requests use of the table to organize its items. In an item delivery subscription service (i.e., same class for both dimensions) with two locations (i.e., different aspects for each class), the organization of the items may indicate when certain items may be delivered and to where. For example, Items A and B, which respectively may represent toilet paper and paper towels, may be delivered every month to the user's first location (e.g., primary residence). Items α and β, which respectively may represent propane and fire logs, may be delivered every month to the user's second location (e.g., vacation rental). Similarly, items within the cell 412(b) may be delivered every two months to the user's first location, items within the cell 412(c) may be delivered every two months, and so on and so forth.

In some examples, the user may desire to adjust the location of the items within the table 404. In some examples, the user may be enabled to move items from one cell to another cell using a movement function, such as a drag-and-drop operation. Movement 414 illustrates an example sequence of moving Item F from the cell 412(c) to the cell 412(*b*) using a drag-and-drop operation. In some examples, the recurring item management module 302 (FIG. 3) may manage the movement of Item F. First, a user may select Item F within the cell 412(*c*) (i.e., a first location) using an input device. After the user has selected Item F, a visual indicator, such as visual indicator 416 may be presented to assist the user in moving Item F. Examples of the visual indicator 416 may include: arrows, highlighting effects of items or cells, other adjustments to graphical characteristics of items or cells (e.g., color effects, transparency effects, contrast effects, and other characteristics), flashing indicators, and other visual indicators. In some examples, the visual indicator 416 may help to drive user choices. Thus, the visual indicator 416 may be desirable to help drive the user to move Item F to the cell 412 (*b*). In some examples, the movement 414 may result in the user being entitled to a promotion or receiving some benefit. Such a promotion or benefit may be presented to the user in the form of a message window, such as message window 418. The message window 418 may be presented in the form of a pop-up window. Within the message window 418 is the text "Save 15% by Combining 3 or More Items." This may indicate to the user that by combing Item F with Item C and Item D in the cell 412(*b*) may result in costs savings. These cost savings may be attributable to a reduction in shipping costs because of the items being grouped together. In some examples, the message window 418 may indicate other messages related to the movement of items within the table 404, and may be presented before the movement 414 begins, during the movement 414, or after the movement 414 is completed. Returning to the movement 414, after the user selects Item F, the user may drag Item F along the dashed line to the cell 412(*b*). Once within the cell 412(*b*), the user may complete the movement 414 by releasing Item F. In some examples, a record associated with the Item F may then be updated to indicate Item F's location. In addition, a determination may be made to update a delivery interval for Item F based on its new location within the cell 412(*b*).

Movement 420 illustrates an example movement of Item β from the cell 412(*d*) to the cell 412(*f*). The movement 420 may be implemented in a similar manner as the movement 414. In particular, a user may drag Item β from the cell 412(*d*) to the cell 412(*f*) and drop Item β in the cell 412(*f*). In addition, visual indicator 422 may indicate a direction of movement to influence the user's choice. In some examples, once the movement 420 is completed, a notification window, such as notification window 424, may be presented. The notification window 424 may be presented in the form of a pop-up window and include information pertaining to the movement 420, Item β, or other elements of the user interface 402. Example text within the notification window 424 may include: "Do you want to move Item β to Every 3 Months?," "Your Item β has been moved," "Your changes have been saved," "Item β has been moved." Select 'Undo" if you desire to undo this move," and other similar messages. In some examples, the message window 424 may include options for selecting yes and no. If the user agrees with the confirmation message, the user may select a first button 426 indicating "Yes." If the user disagrees with the confirmation message, the user may select a second button 428 indicating "No." In some examples, selecting "Yes" may close the notification window 424. In some examples, selecting "No" may close the notification window 424 and return Item β to its original location. In some examples, the notification window 424 may present a notification of the move. In some examples, the notification may include a notification asking for a confirmation, a no-action notification, or other suitable notifications. For example, once an item is moved from a first cell to a second cell, a notification may be presented in the notification window 424 such as, "Item β gas been moved to the cell 412(*f*). Select 'Undo' if you desire to undo this change." In this manner, the change to the location of the Item β may be saved by the system without user input, but may be undone based on user input. The user interface 402 may also include search button 430, including search bar 432, and add new dimension button 434. The details of features similar to these will be discussed with reference to FIG. 5.

Figure 5:
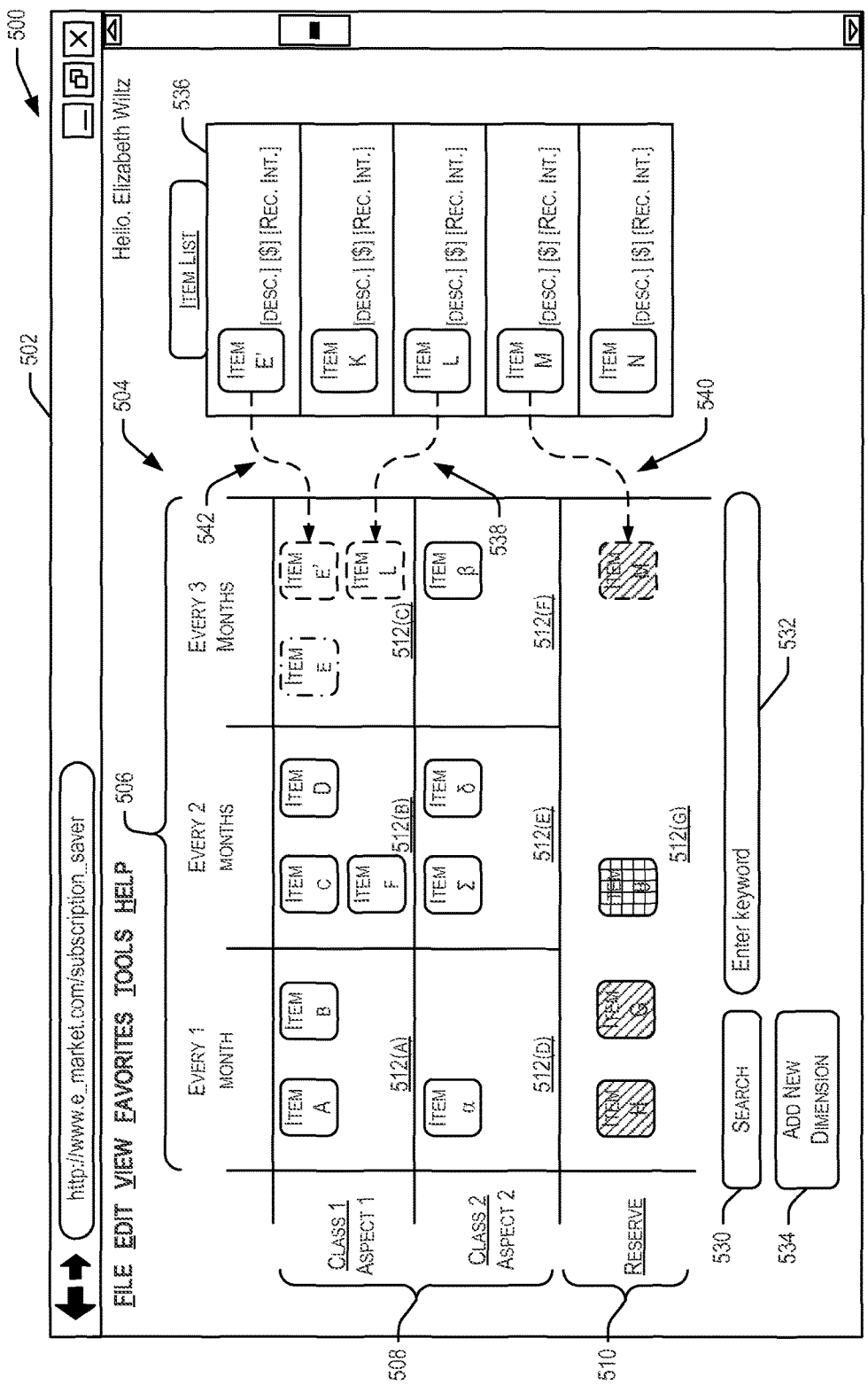
FIG. 5 is an example diagram depicting techniques relating to organization of recurring items as described herein, according to at least one example.

Turning next to FIG. 5, in FIG. 5 is illustrated diagram 500 depicting techniques relating to organization of recurring items as described herein. In some examples, the recurring item management module 220 (FIG. 2) of the recurring management service 202 (FIG. 2) may perform the techniques described with reference to the diagram 500. The diagram 500 is an example of the diagram 400 and includes features similar to those discussed with reference to diagram 400. Thus, the diagram 500 includes user interface 502 including table 504, search button 530, including search bar 532, and an add new dimension button 534. By selecting the add new dimension button 534, the user may request that a new dimension row be created. Such functionality may be desirable for the user to add new classes and/or aspects to existing classes. Within the search bar 532, a user may enter keywords to search for items to add to the table 504. Once the keywords are entered, the user may press the search button 530. In some examples, pushing the search button 530 may cause search results to be populated in item list 536. In some examples, pushing the search button 530 may result in the item list 536 being displayed without entering keywords in the search bar 532. In some examples—whether or not the user entered search terms or pushed the search button 530—the item list 536 may be populated to include one or more recommended items. In some examples, the recommended items may be selected based on previous searches performed by the user or similar users. In some examples, the recommended items may be selected based on user information, item information, and any suitable combination of the foregoing. In this manner, the item list 536 may provide the user with options for selecting items to add to the table 504. In some examples, the items in the item list 536 may be organized according to characteristics of the items and may also be filtered using one or more filters based on the characteristics. For example, assume that the user has performed a search and the results are displayed in the items list 536 as including recommended items, searched items, wish-list items, and shopping-cart items. The user may then filter the results to show one or more of the groups of items (e.g., recommended items and wish-list items).

The item list 536 may include one or more items and details about those items. For example, the items in the item list 536 may include a description field (i.e., "[desc.]"), a cost field (i.e., "[$]"), and a recommended interval field (i.e., "[rec. int.]"). Other fields, or less fields, may be included as part of the item list 536. In some examples, the description field may describe details about the item, the cost field may describe a cost of the item, and the recommended interval field may provide a recommended interval for the particular item. The recommended interval may be based on historical information for purchasers of the item in an electronic marketplace (i.e., how often do purchasers typically buy the item), historical information for subscribers to a relevant service (e.g., for an item delivery service-how often do subscribers typically receive the item), product-related information (e.g., shelf-life, usefulness, etc.), and other aspects related to the item. In some examples, the recommended interval may indicate a cell location for the associated item. In some examples, once the user begins to move the item from the item list 536 towards the table 504, a recommended location corresponding to the recommended interval may be indicated.

The one or more items of the item list 536 may be added to the table 504. In some examples, one or more of the items from the item list 536 may be added using a drag-and-drop operation. Examples of moving items from the item list 536 are illustrated by substitute movement 542, add movement 538, and reserve movement 540. The substitute movement 542 may include moving Item E' to cell 512(*c*). In some examples, the system may have prompted the user to implement the substitute movement 542 because Item E' is a comparable item to Item E (which is already in the cell 512(*c*)) and may be more desirable to the user. For example, if the cost of Item E' were less than that of Item E, then perhaps the user would be interested in substituting Item E' for Item E. In some examples, once Item E' is moved to the cell 512(*c*), the system may ask whether the user desires to keep Item E within the cell 512(*c*). If not, then Item E may be removed from the cell 512(*c*). The add movement 538 may include moving new Item L from the item list 536 to the cell 512(*c*) such that Item L is delivered to the user every three months along with Item E'. In some examples, the add movement 538 (or any other suitable movement) may include features that may have an effect on visual affordance associated with the table 504. For example, the add movement 538 (or any other suitable movement) may include a snap function to a recommended cell location. For example, once the user selects an item within the item list 536 or within the table 504, a depiction of the item in a new location may be shown and the user may allow the item to snap to the new location. In some examples, the recommended cell location may be indicated by a depiction of the item within the recommended cell. For example, a depiction of Item L may be shown in the recommended cell, such as is shown in the cell 512(*c*). In some examples, the depiction of the item may include an outline of the item, an outline of a representation of the item, a visual effect added to the recommended cell, and other suitable depiction techniques. In some examples, the recommended cell location may be based on a class associated with the cell, an aspect of the class associated with the cell, a dimension associated with the cell, and any suitable combination of the foregoing. In some examples, the recommended cell location may be based on user information, demographic information, historical information, and any suitable combination of the foregoing. Thus, the placement of an item within the table 504 may be recommended, and in some examples, may even be placed automatically within the recommended cell. The reserve movement 540 may include moving new Item M from the item list 536 to the cell 512(*g*) in reserve portion 510. In this manner, the reserve portion 510 may act as a wish-list for items that the user desires to include under a service in the future.

In some examples, the cells 512(*a*)-512(*g*) of the table 504 may adjust to accommodate a plurality of items. For example, if one cell has a larger number of items than can be presented in connection with the other cells, then the cells may be adjusted independent of each other. In some examples, the cells may include scroll bars or the table may be resized to accommodate the items within the cells. In this manner, the user is presented with a convenient layout of items and their frequency intervals.

Figure 6:
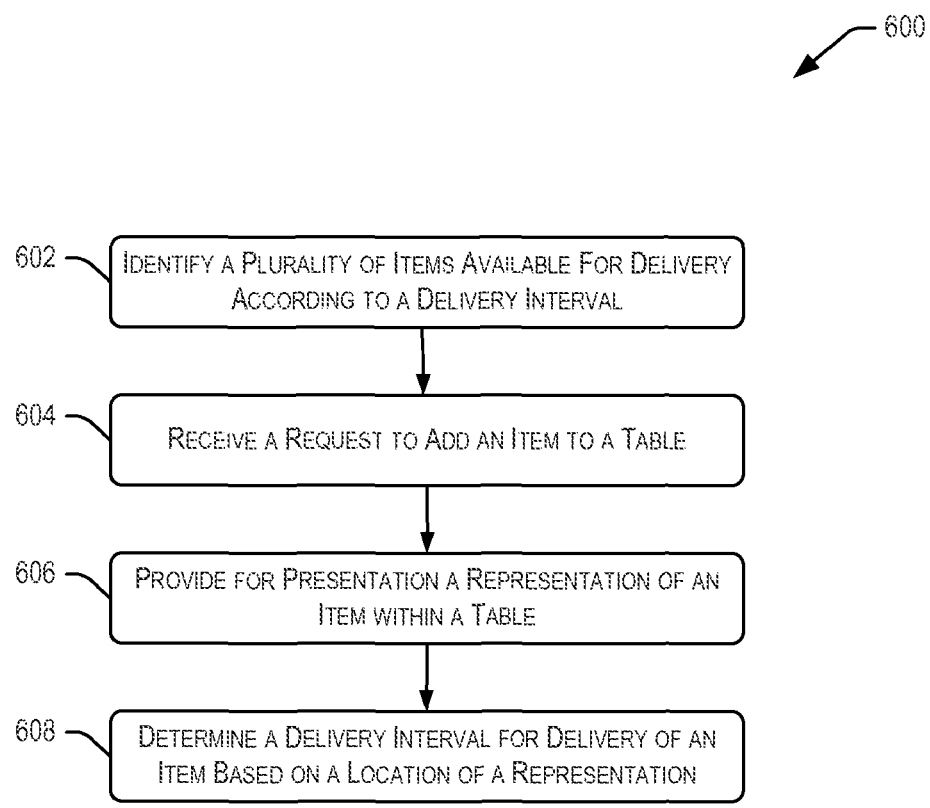
FIG. 6 is a flow diagram depicting example acts for implementing techniques relating to organization of recurring items as described herein, according to at least one example.

Turning next to example acts and/or procedures that may be performed using techniques described herein, in accordance with at least one example. FIG. 6 depicts process 600 including example acts for techniques relating to recurring item organization in accordance with at least one example. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The recurring item management module 220 (FIG. 2) of the recurring management service 202 (FIG. 2) may perform the process 600 of FIG. 6. The process 600 begins at 602 by identifying a plurality of items available for delivery according to a delivery interval. In some examples, identifying a plurality of items available for delivery according to a delivery interval may be performed by the identification component 306 (FIG. 3). Identifying a plurality of items may include identifying a plurality of items within an item list. In some examples, the item list may be populated in response to an add request or search request. The plurality of items may also be those that available in an electronic marketplace on a subscription basis. At 604, the process 600 receives a request to add an item to a table. In some examples, receiving a request to add an item to a table may be performed by the communication component 304. The request may be received from a user. In some examples, the table may be arranged in accordance with a period corresponding to delivery intervals. The period may be any suitable unit of time measurement. At 606, the process 600 provides for presentation a representation of an item within a table. In some examples, providing for presentation a representation of an item within a table may be performed by the presentation component 308 (FIG. 3). Providing for presentation may include, for example, providing for presentation in accordance with a request received from a user. In some examples, the request may be received in the form of a drag-and-drop operation. At 608, the process 600 determines a delivery interval for delivery of an item based on a location of a representation. In some examples, determining a delivery interval for delivery of an item based on a location of a representation may be performed by the management component 310 (FIG. 3). Determining a delivery interval may include identifying the location of the representation of the item and updating a record corresponding to the item in a data structure. In some examples, the delivery interval, frequency interval, or other interval may include a default interval. Determining a default interval may include accessing historical information related to the item, accessing user profile information, and accessing other types of information to determine an appropriate default. In some examples, the default interval is predetermined for each item.

Figure 7:
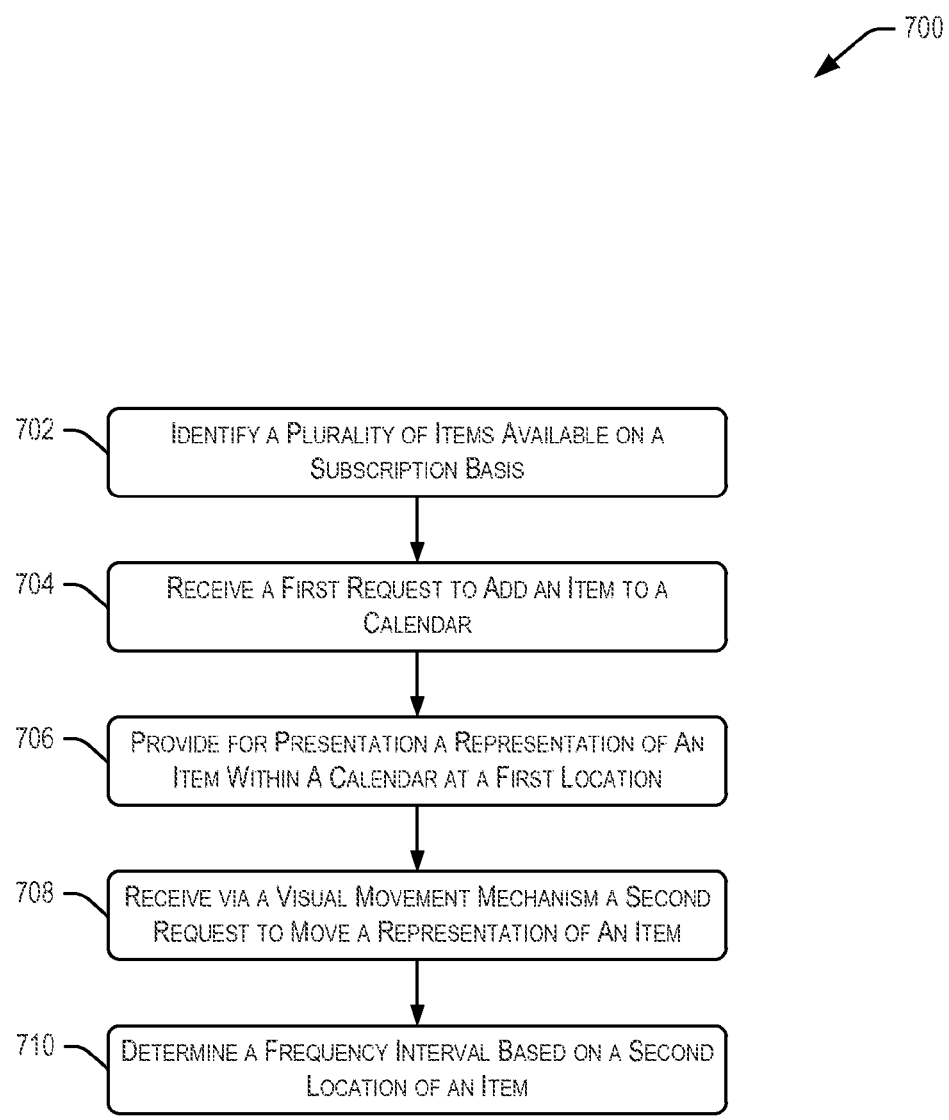
FIG. 7 is a flow diagram depicting example acts for implementing techniques relating to organization of recurring items as described herein, according to at least one example.

Turning next to example acts and/or procedures that may be performed using techniques described herein, in accordance with at least one example. FIG. 7 depicts process 700 including example acts for techniques relating to recurring item organization in accordance with at least one example. The recurring item management module 220 (FIG. 2) of the recurring management service 202 (FIG. 2) may perform the process 700 of FIG. 7. The process 700 begins at 702 by identifying a plurality of items available on a subscription basis. In some examples, identifying a plurality of items available on a subscription basis may be performed by the identification component 306 (FIG. 3). Identifying a plurality of items may include identifying items available in an electronic marketplace. Identifying a plurality of items may include providing for presentation a list including a plurality of items. In some examples, the plurality of items may be deliverable in accordance with at least one of a plurality of frequency intervals. At 704, the process 700 receives a first request to add an item to a calendar. In some examples, receiving a first request to add an item to a calendar may be performed by the communication component 304 (FIG. 3). Receiving a first request may include receiving a first request from a user in response to a search request. In some examples, receiving a first request may include receiving a first request via a drag-and-drop operation. In some examples, the calendar may be arranged in accordance with a portion of the frequency intervals. At 706, the process 700 provides for presentation a representation of an item within a calendar at a first location. In some examples, providing for presentation a representation of an item within a calendar at a first location may be performed by the presentation component 308 (FIG. 3). Providing for presentation may include providing for presentation on a display of a user device. At 708, the process 700 receives via a visual movement mechanism a second request to move a representation of an item. In some examples, receiving via a visual movement mechanism a second request to move a representation of an item may be performed by the communication component 304. Receiving via a visual movement mechanism may include receiving via a drag-and-drop function. At 710, the process 700 determines a frequency interval based on a second location of an item. In some examples, determining a frequency interval based on a second location of an item may be performed by the management component 310 (FIG. 3). Determining a frequency may include identifying a representation of the item being at the second location and updating a record corresponding to the item to reflect that the item is at the second location. In some examples, determining a frequency may include presenting a representation of the item at the second location. In some examples, a periodic schedule may then be created to define one or more actions to be taken in accordance with the frequency interval. For example, the one or more actions may include delivery of certain items to the user.

Figure 8:
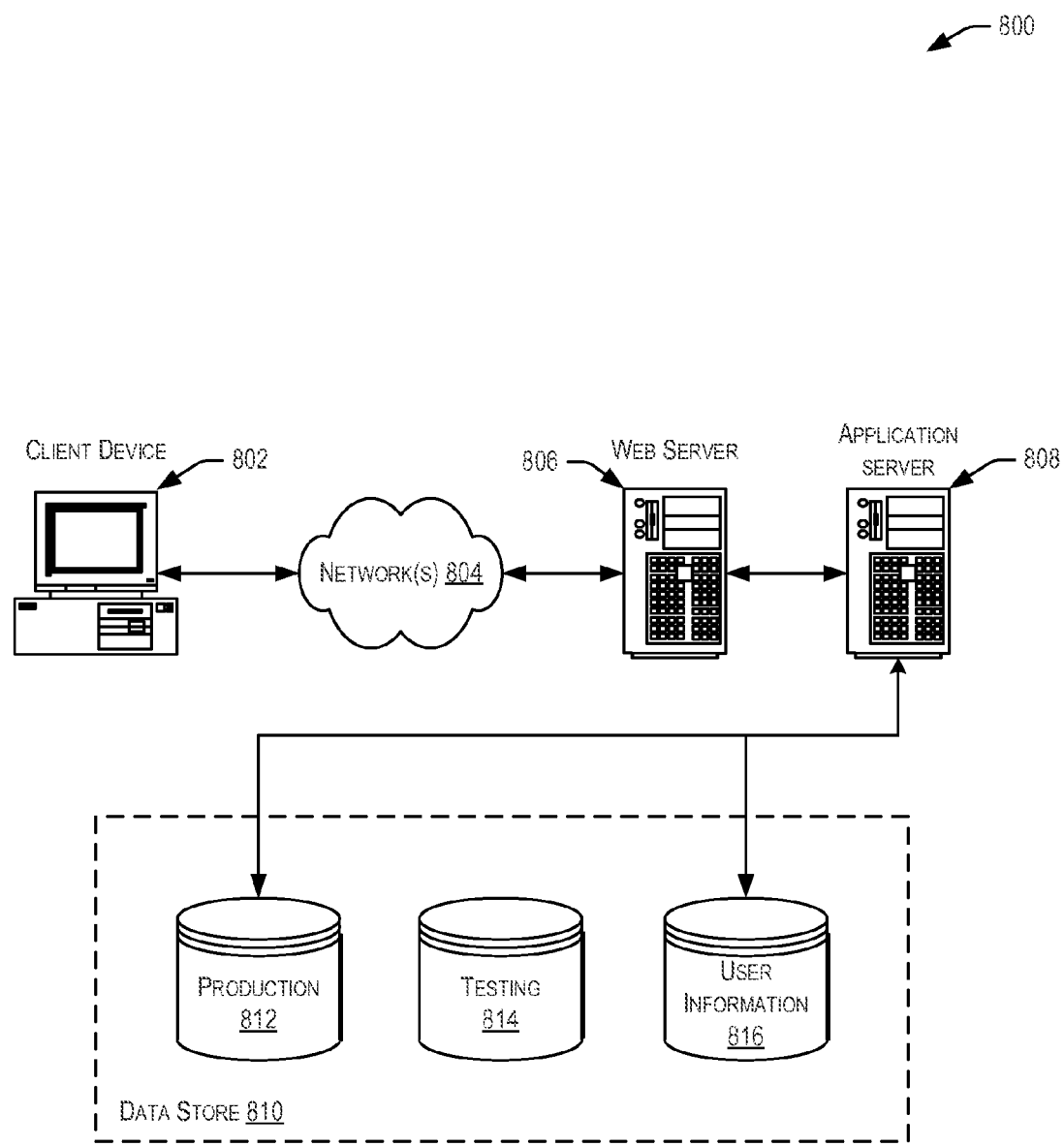
FIG. 8 is an example schematic environment for implementing techniques relating to organization of recurring items as described herein, according to at least one example.

FIG. 8 illustrates aspects of an example schematic environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any suitable device operable to send and receive requests, messages, or information over a suitable network 804 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for accessing requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices, and/or data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8 Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network, or any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage devices for storing computer-executable instructions that, when executed by one or more computer systems, configure the one or more computer systems to perform operations comprising:
    identifying a plurality of items in an electronic marketplace, each of the plurality of items being available on a subscription basis for delivery in accordance with at least one of a plurality of frequency intervals;
    receiving a first request from a user to add an item from the plurality of items to a calendar, the calendar presenting subscription information specifically for the user and being arranged in accordance with a portion of the plurality of frequency intervals;
    providing, for presentation, a graphical representation of the item at a first location within the calendar in accordance with the first request;
    receiving information regarding a drag-and-drop operation performed by the user, the information representing a second request to move the graphical representation of the item to a second location within the calendar; and
    at least in response to receiving the second request, determining an updated frequency interval for delivery of the item based at least in part on the second location within the calendar.

2. The one or more non-transitory computer-readable storage devices of claim 1, wherein the instructions further configure the one or more computer systems to perform operations comprising providing, for presentation, the graphical representation of the item at the second location within the calendar in accordance with the second request.

3. The one or more non-transitory computer-readable storage devices of claim 1, wherein the instructions further configure the one or more computer systems to perform operations comprising providing, for presentation, a portion of the plurality of items to the user in the form of a list prior to receiving the first request.

4. The one or more non-transitory computer-readable storage devices of claim 1, wherein the frequency interval comprises a default frequency interval based at least in part on the item and historical information related to the item.

5. A computer-implemented method comprising:
    identifying, by a computer system, a plurality of items, each of the plurality of items being available for delivery in accordance with at least one of a plurality of delivery intervals;
    receiving, via a user interface, a request from a user to add an item from the plurality of items to a table, the table presenting subscription information specifically for the user and being arranged in accordance with a period corresponding to at least a portion of the plurality of delivery intervals;
    providing a graphical representation of the item for presentation, the graphical representation of the item within the table in accordance with the request; and
    determining, by the computer system, a delivery interval for delivery of the item based at least in part on a location of the graphical representation with respect to the table.

6. The computer-implemented method of claim 5, wherein the plurality of delivery intervals comprise at least one of an every-month interval, an every-second-month interval, an every-third-month interval, or an every-fourth-month interval, and wherein the period comprises one month.

7. The computer-implemented method of claim 5, wherein the plurality of items comprises items in an electronic marketplace that are available on a subscription basis.

8. The computer-implemented method of claim 7, wherein the plurality of items in the electronic marketplace comprise at least one of a household item, a pet supply item, an office supply item, a food item, or an automotive item.

9. The computer-implemented method of claim 5, wherein the table, when presented on the user interface, comprises an interval portion arranged according to a horizontal axis, a dimension portion arranged according to a vertical axis, and a plurality of cells presented adjacent to the interval portion and the dimension portion.

10. The computer-implemented method of claim 9, wherein the interval portion includes the portion of the plurality of delivery intervals arranged according to the period, and the dimension portion includes at least one dimension comprising at least one of an item delivery subscription service, a produce delivery subscription service, a pantry item delivery service, or a periodical subscription service.

11. The computer-implemented method of claim 5, further comprising:
receiving, information regarding a drag-and-drop operation performed via the user interface, the information representing a second request from the user to move the graphical representation of the item from the location to a second location within the table; and
updating the delivery interval for delivery of the item based at least in part on the second location of the graphical representation with respect to the table.

12. The computer-implemented method of claim 11, further comprising providing a message for presentation, the message indicating a characteristic of a subscription service based on the item being within the table at the second location.

13. The computer-implemented method of claim 12, wherein the characteristic comprises a cost savings characteristic.

14. The computer-implemented method of claim 11, further comprising providing a visual indicator for presentation, the visual indicator at least to direct the user to move the item to the second location upon initiation of the drag-and-drop operation.

15. The computer-implemented method of claim 14, wherein the visual indicator comprises at least one of a directional arrow pointing in a direction of the second location, a highlighting effect of an area adjacent to the second location, a highlighting effect of the item, a color change effect of the area adjacent to the second location, or a color change effect of the item.

16. A system comprising:
memory that stores computer-executable instructions; and
at least one processor configured to access the memory and execute the computer-executable instructions to collectively at least:
provide, for presentation, a table including a plurality of cells and a graphical representation corresponding to an item, the graphical representation within at least one cell of the plurality of cells and the item available on a subscription basis in connection with an electronic marketplace, the table presenting subscription information specifically for a user;
receive a request from the user to move the graphical representation from the at least one cell of the plurality of cells to a second cell of the plurality of cells;
provide, for presentation, the graphical representation within the second cell in accordance with the request;
provide, for presentation, a notification of the request, the notification indicating at least one characteristic of the item based at least in part on the graphical representation being within the second cell; and
set a periodic schedule for execution of one or more operations with respect to the item based in at least in part on the graphical representation being within the second cell.

17. The system of claim 16, wherein the request is received as information regarding a drag-and-drop operation at a user interface, the information representing the request.

18. The system of claim 16, wherein the notification comprises at least one of a request that the user acknowledge that the graphical representation has been moved, a confirmation that the graphical representation has been moved, or a no-action confirmation that the graphical representation has been moved.

19. The system of claim 16, wherein the periodic schedule is determined based at least in part on the graphical representation being within the second cell.

20. The system of claim 16, wherein the request comprises a first request, the item comprises a first item, and the graphical representation comprises a first graphical representation, and wherein the at least one processor is further configured to access the memory and execute the computer-executable instructions to collectively at least:
receive a second request from the user, the second request to add a second item to the table;
in response to receiving the second request, provide a list for presentation, the list including the second item and other items each of the other items being available on a subscription basis in connection with the electronic marketplace;
receive a selection of the second item from the list;
provide a placement recommendation, the placement recommendation indicating at least a recommended cell for placement of a second graphical representation of the second item; and
provide the second graphical representation for presentation, the second graphical representation of the second item within the recommended cell.

* * * * *